US008896779B2

(12) United States Patent
Jeong et al.

(10) Patent No.: US 8,896,779 B2
(45) Date of Patent: Nov. 25, 2014

(54) LASER OSCILLATION DEVICE

(75) Inventors: Mi-Yun Jeong, Seoul (KR);
Jeong-Weon Wu, Seoul (KR)

(73) Assignee: Industry-Academic Cooperation Foundation Gyeongsang National University, Gyeongsangnam-do (KR)

( * ) Notice: Subject to any disclaimer, the term of this patent is extended or adjusted under 35 U.S.C. 154(b) by 174 days.

(21) Appl. No.: 13/389,101

(22) PCT Filed: Aug. 5, 2010

(86) PCT No.: PCT/KR2010/005138
§ 371 (c)(1),
(2), (4) Date: Mar. 6, 2012

(87) PCT Pub. No.: WO2011/016682
PCT Pub. Date: Feb. 10, 2011

(65) Prior Publication Data
US 2012/0147288 A1 Jun. 14, 2012

(30) Foreign Application Priority Data
Aug. 5, 2009 (KR) .................. 10-2009-0072100

(51) Int. Cl.
G02F 1/1343 (2006.01)
H01S 3/16 (2006.01)
H01S 3/102 (2006.01)
H01S 3/08 (2006.01)

(52) U.S. Cl.
CPC ............. *H01S 3/1686* (2013.01); *H01S 3/102* (2013.01); *H01S 3/08086* (2013.01); *H01S 3/08081* (2013.01)
USPC ............................ 349/55; 349/179; 349/155

(58) Field of Classification Search
USPC ............. 349/55, 179, 162, 155, 193; 359/53
See application file for complete search history.

(56) References Cited

U.S. PATENT DOCUMENTS 5,061,046 A * 10/1991 Lee et al. ..................... 349/193

FOREIGN PATENT DOCUMENTS

| JP | 06318766 A | 11/1994 |
| JP | 2005116980 A | 4/2005 |
| JP | 2005244106 A | 9/2005 |
| KR | 20070065973 A | 6/2007 |

* cited by examiner

*Primary Examiner* — Thoi Duong
(74) *Attorney, Agent, or Firm* — Blank Rome LLP

(57) ABSTRACT

Provided is a laser oscillation device. A second substrate is disposed above a first substrate in such a manner that a wedge cell is formed between the first and second substrates. A liquid crystal layer is formed by two or more liquid crystals which are injected into the wedge cell and have different pitches. Therefore, a consecutive wavelength-variable lasing process is possible in a certain wavelength region.

8 Claims, 7 Drawing Sheets

LASER OSCILLATION DEVICE

REFERENCE TO RELATED APPLICATION

This patent application is a national stage of PCT/KR2010/005138, filed Aug. 5, 2010, which claims priority to KR 10-2009-0072100, filed Aug. 5, 2009, the entire disclosures of which are incorporated herein by reference.

TECHNICAL FIELD

The present invention is directed to a laser oscillation device, and more particularly to a laser oscillation device which uses wedge cells enabling a consecutive wavelength-variable lasing process in a certain wavelength region.

BACKGROUND ART

In general, a conventional laser oscillation device mainly uses cells having uniform thicknesses. In order to realize wavelength-variable lasing, the conventional laser oscillation device is fabricated by injecting a cholesteric liquid crystal with a pitch into the cells having the uniform thicknesses. And in order to change pitch, ultraviolet (UV) light or temperature control could be applied.

However, the cholesteric liquid crystal used in the conventional laser oscillation device operates as a laser resonator, and the cells having the uniform thicknesses correspond to Fabry-Perot laser cavity in which a length of the laser resonator is uniformly fixed. Therefore, if lasing is performed by using the conventional laser oscillation device, a laser shows a laser line oscillation in a wide wavelength region but results in inconsecutive wavelength-variable lasing, i.e., an inconsecutive laser wavelength oscillation. Also, an optical parametric oscillator (OPO) which is a conventional consecutive wavelength-variable laser system uses a high-priced optical device. Therefore, cost increases, and a small device is not provided.

DETAILED DESCRIPTION OF THE INVENTION

Technical Problem

The present invention provides a laser oscillation device which enables a consecutive wavelength-variable lasing process in a wavelength region of several nm or hundreds of nm.

Technical Solution

According to an aspect of the present invention, there is provided a laser oscillation device including: a first substrate; a second substrate which is disposed above the first substrate to form a wedge cell between the first substrate and the second substrate; and a liquid crystal layer which is formed by two or more liquid crystals which are injected into the wedge cell and have different pitches.

The two or more liquid crystals may diffuse in the wedge cell to form consecutive pitch gradients.

After the consecutive pitch gradients are formed, ultraviolet (UV) rays may be radiated or heat is applied to polymerize the liquid crystals.

The laser oscillation device may further include at least two spacers which are disposed on sides of the first and second substrates to form the wedge cell.

Heights of the at least two spacers corresponding to a distance between the first and second substrates may be different from each other.

The two or more liquid crystals may be respectively injected into a side of the wedge cell having a thick thickness and an other side of the wedge cell having a thin thickness in opposite directions.

The two or more liquid crystals may be cholesteric liquid crystals which are formed of a nematic liquid crystal and chiral dopant. The different pitches may be determined by a relative concentration ratio between the nematic liquid crystal and the chiral dopant.

Advantageous Effects

As described above, in a laser oscillation device according to the present invention, consecutive wavelength-variable lasing in a visible ray region may be realized by using non-polymeric or polymeric cholesteric liquid crystals. This principle may be applied to both of an ultraviolet (UV) ray region and the visible ray region or an infrared (IR) ray region, and thus a consecutive wavelength modulation may be realized in several nm region or in hundreds of nm region.

In other words, in a wedge optical device made of cholesteric liquid crystals and a laser dye, a laser enabling consecutive wavelength-variable lasing in a range of hundreds of nm or more may be fabricated. In particular, laser lines having monochromatic wavelengths may be consecutively generated in a range of about 100 nm or more without another additional optical device. Therefore, a low-cost, miniature, high-efficient wideband wavelength-variable laser may be fabricated and may be independently used as a laser source.

Also, the laser oscillation device according to the present invention may be more highly efficient than an optical parametric oscillator (OPO) which is an existing consecutive wavelength-variable laser system and may provide all characteristics and advantages which are provided by a general cholesteric liquid crystal laser. Accordingly, the laser oscillation device according to the present invention may be applied to a laser, optical science, an optical device of a spectroscope, optical industry, etc. In particular, if the laser oscillation device is applied in an optical communication, the laser oscillation device may increase a signal transmission efficiency of the optical communication.

BEST MODE OF THE INVENTION

Embodiments of the present invention will now be described with reference to the accompanying drawings. In the description of the present invention, if it is determined that detailed descriptions of related well-known functions or structures may unnecessarily make the spirit of the present invention vague, they may be omitted.

Figure 1:
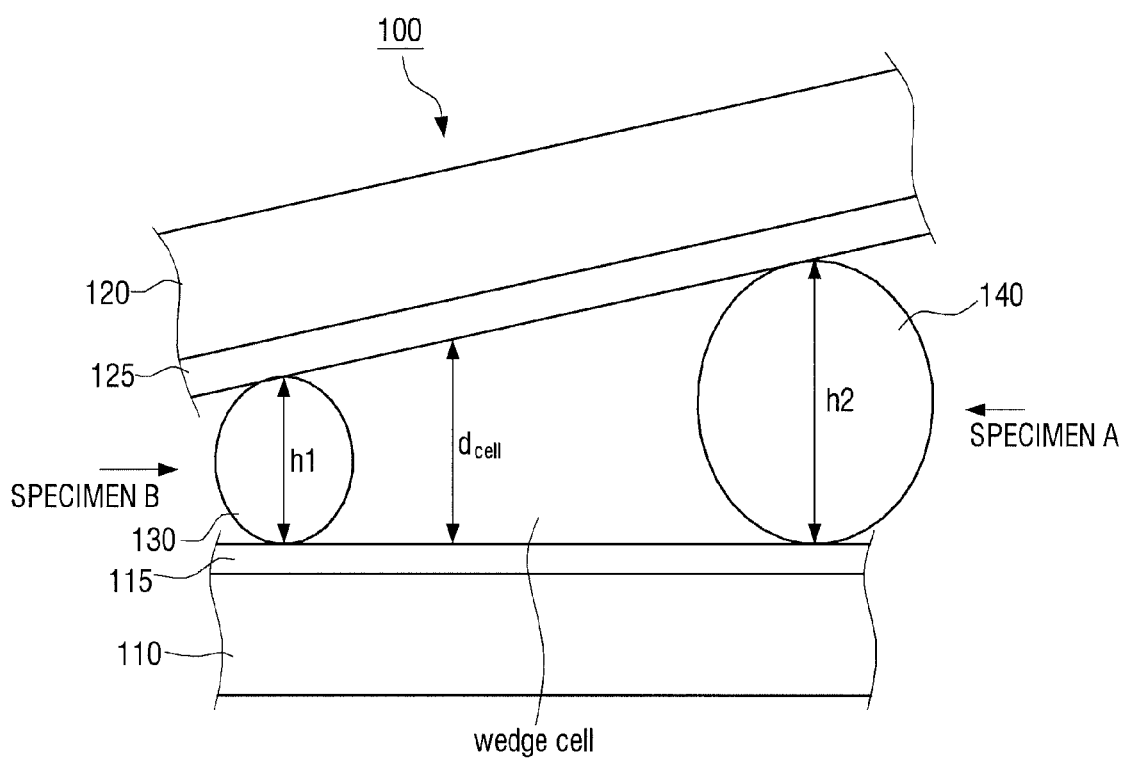
FIG. 1 is a cross-sectional view of a laser oscillation device into which cholesteric liquid crystals have not been injected yet, according to an embodiment of the present invention.

FIG. 1 is a cross-sectional view of a laser oscillation device into which cholesteric liquid crystals have not been injected yet, according to an embodiment of the present invention.

Referring to FIG. 1 a laser oscillation device 100 includes a first substrate 110, a second substrate 120, a first spacer 130, a second spacer 140, and a liquid crystal layer 150. The first and second substrates 110 and 120 may be slide glasses or indium tin oxide (ITO) transparent electrode glasses. If the first substrate 110 is a lower substrate, the second substrate 120 inclines toward the first substrate 110 at a predetermined angle. A gradient of the second substrate 120 may be determined by the first and second spacers 130 and 140 which will be described later.

A cell is to be fabricated in order to fabricate the laser oscillation device 100. For this purpose, polyimide is coated on an upper surface of the first substrate 110 and a lower surface of the second substrate 120 and then rubbed to form liquid crystal alignment layers 115 and 125. The liquid crystal alignment layers 115 and 125 may be formed of various materials such as polyimide, polyamide, polyamide imide, polyphenylene oxide, etc.

Figure 2:
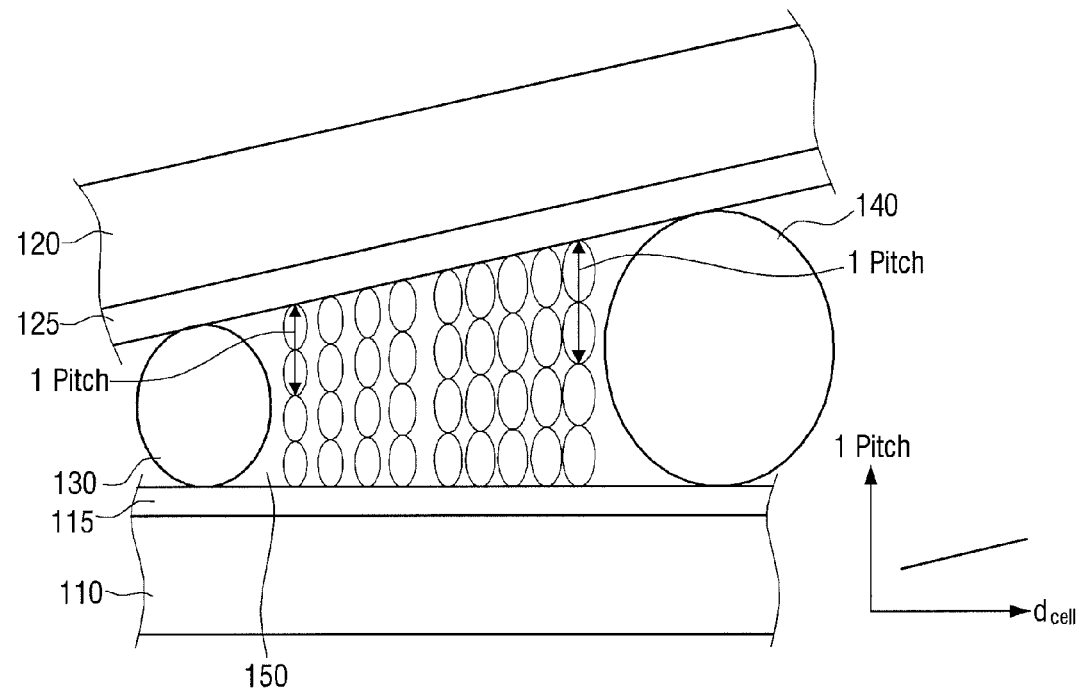
FIG. 2 is a cross-sectional view of a laser oscillation device which includes a liquid crystal layer which is formed by injecting cholesteric liquid crystals into a wedge cell of FIG. 1.

After the rubbing process, as shown in FIG. 2, the first and second spacers 130 and 140 having different sizes, e.g., respectively having heights h1 and h2, are disposed between the first and second substrates 110 and 120 to form an empty wedge cell between the first and second substrates 110 and 120. In other words, in the present invention, the first and second spacers 130 and 140 are respectively disposed on sides of the first and second substrates 110 and 120 in order to form a wedge cell between the first and second substrates 110 and 120.

FIG. 2 is a cross-sectional view of a laser oscillation device which includes a liquid crystal layer formed by injecting cholesteric liquid crystals into the wedge cell of FIG. 1.

If the wedge cell is formed as shown in FIG. 2, two or more types of specimens having different pitches or different wide bandgap positions are injected into the wedge cell to form the liquid crystal layer 150. In the current embodiment of the present invention, two types of specimens A and B are injected into the wedge cell, but the number of specimens are not limited to two.

The two specimens A and B are liquid crystals for forming the liquid crystal layer 150, e.g., may be cholesteric liquid crystals. The cholesteric liquid crystals are generated by mixing a nematic liquid crystal with chiral dopant. Therefore, each of the specimens A and B is determined according to a ratio between the nematic liquid crystal and the chiral dopant which are mixed with the cholesteric liquid crystals.

Here, various types of laser dyes may be added to the cholesteric liquid crystals to widen or narrow a lasing wavelength band. Laser dyes having fluorescence spectrum regions may be used in regions in which laser oscillations are to be consecutively performed. In other words, a laser dye having a fluorescence spectrum region may be added to each of the cholesteric liquid crystals in a region in which laser tuning is to be performed.

Also, when fabricating the two specimens A and B, first pitches of the two specimens A and B, i.e., positions of photonic crystal bandgaps of the two specimens A and B, may be determined by adjusting a relative concentration ratio between the nematic liquid crystal and the chiral dopant. For example, each of bandwidths of the two specimens A and B used in the present invention is about 50 nm, and optical pitches of the two specimens A and B have a difference of about 100 nm.

Figure 3:
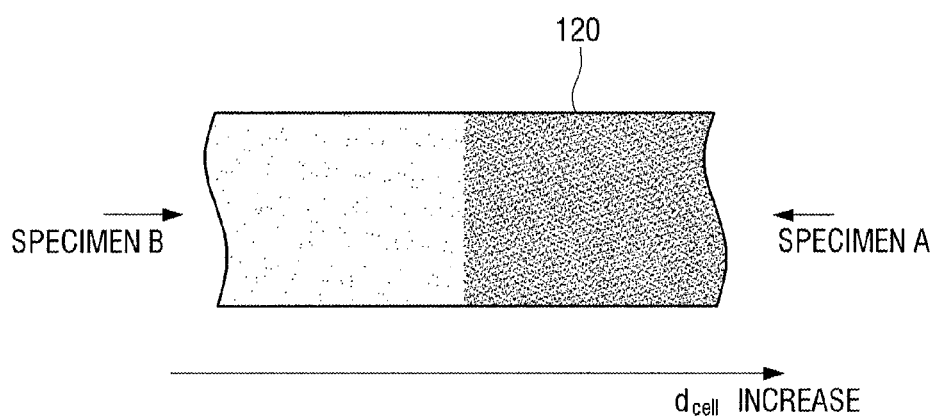
FIG. 3 is a plan view of the laser oscillation device of FIG. 1.
Figure 4:
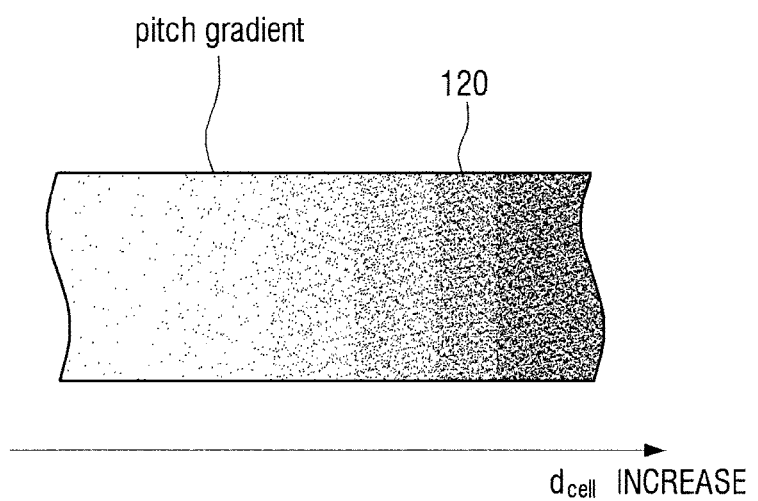
FIG. 4 is a plan view illustrating a pitch gradient which is formed by specimens injected into a wedge cell.

FIG. 3 is a plan view of the laser oscillation device of FIG. 1, and FIG. 4 is a plan view illustrating a pitch gradient formed by specimens injected into a wedge cell. Black and white colors are shown in FIGS. 3 and 4 but may be changed according to added dyes.

Referring to FIGS. 1 and 3, fabricated two cholesteric liquid crystals, i.e., the two specimens A and B, are injected into both sides of the wedge cell to form the liquid crystal layer 150. For example, the specimen A is injected to a side of the wedge cell having a high height $d_{cell}$, and the specimen B is injected into a side of the wedge well having a low height $d_{cell}$. The injected two specimens A and B meet each other inside the wedge cell (e.g., in the center of the wedge cell) due to their diffusions. Therefore, the liquid crystal layer 150 under the transparent second substrate 120 is formed as shown in FIG. 3. In other words, FIG. 3 shows a liquid crystal layer formed under the transparent second substrate 120.

If time elapses, the two specimens A and B continuously diffuse, and consecutive pitch gradients are formed in the liquid crystal layer 150 as shown in FIG. 2 or 4. In other words, a laser resonator in which photonic crystal bandgaps continuously vary over a predetermined region due to the diffusions of the two specimens A and B is fabricated. Referring to FIG. 2, a length of a first pitch is proportional to a thickness $d_{cell}$ of the wedge cell. In other words, the length of the first pitch increases with an increase in the thickness $d_{cell}$ of the wedge cell.

For example, if positions of the photonic crystal bandgaps of the two specimens A and B have a difference of about 100 nm or more, a laser resonator in which photonic crystal bandgaps consecutively vary over 100 nm is fabricated.

Accordingly, as a laser pumper beam is radiated with moving from a side of the wedge cell having a thick thickness $d_{cell}$ toward a side of the wedge cell having a thin thickness $d_{cell}$, a bandwidth hardly varies (i.e., is almost uniformly maintained) but a position of a photonic band consecutively moves. In particular, since a laser is generated from an edge of a photonic band gap, the edge of the photonic band gap varies with the movement of the position of the photonic band. Therefore, laser lines may be oscillated with consecutively varying wavelengths.

Figure 6:
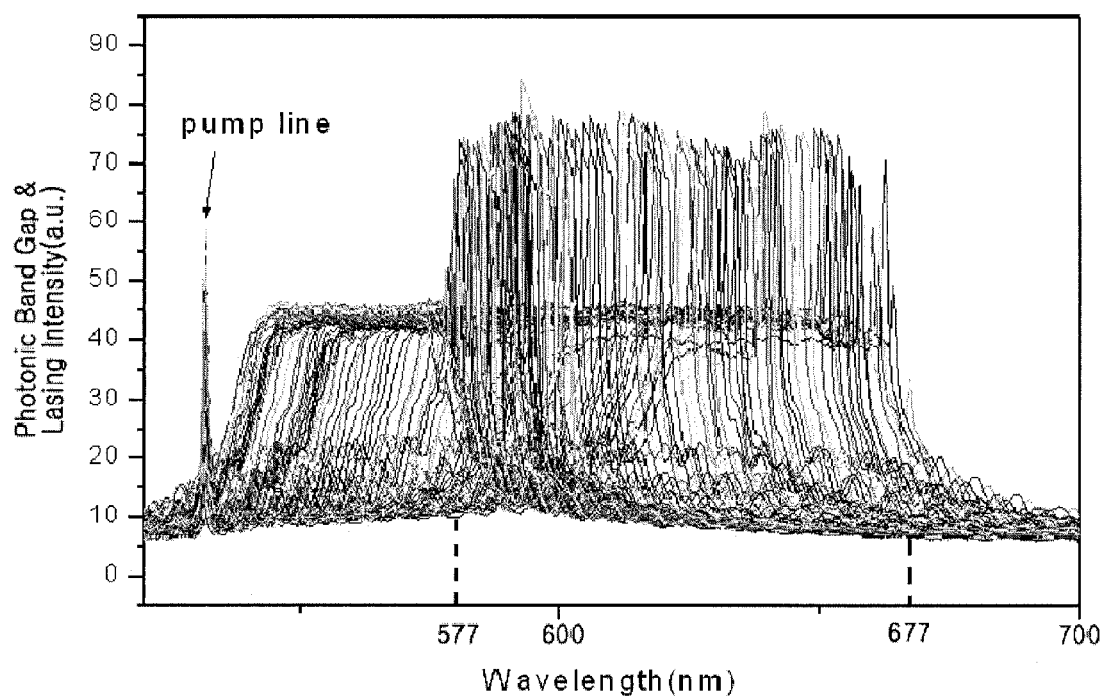
FIGS. 6 and 7 are graphs illustrating consecutive wavelength-variable lasings which are realized by using laser oscillation devices according to embodiments of the present invention.
Figure 7:
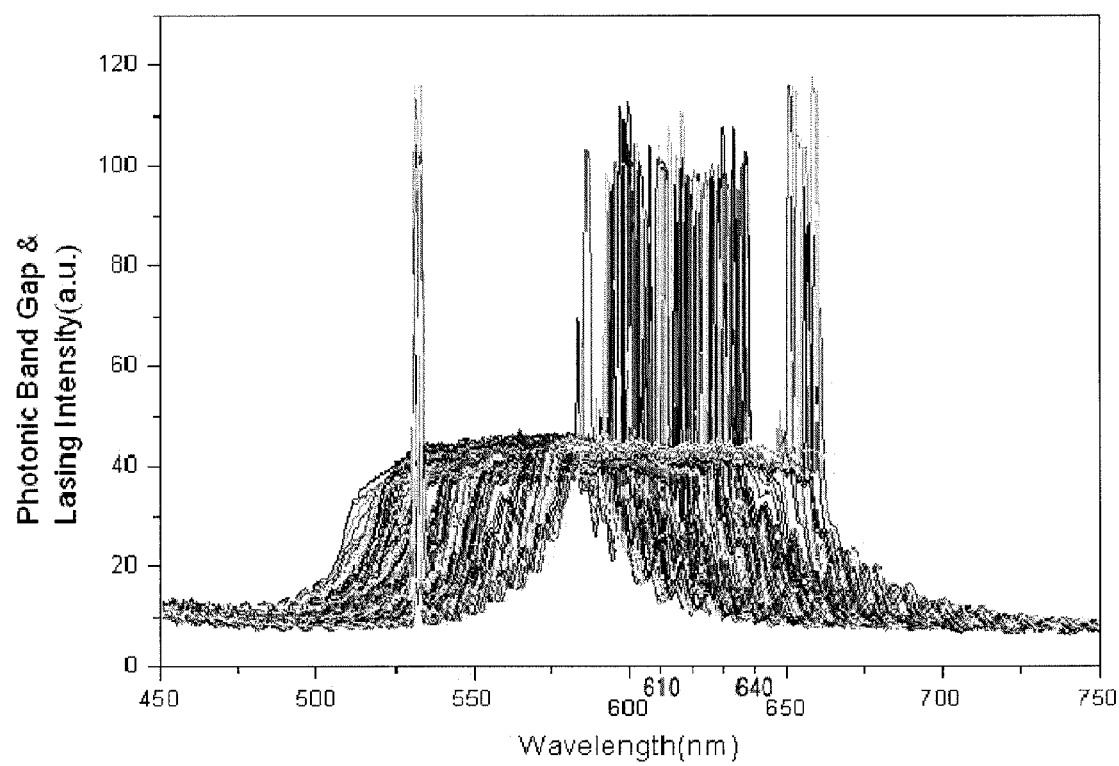

As described above, a position of a bandgap may be determined by adjusting a relative concentration ratio between a nematic liquid crystal and chiral dopant. If a pumper beam is used as a laser, a position of the bumper beam may be moved from a side of a wedge cell having a thick thickness $d_{cell}$ toward a side of the wedge cell having a thin thickness $d_{cell}$. Therefore, a laser whose wavelength is consecutively tuned as shown in FIG. 6 or 7 may oscillate.

In a laser oscillation device according to another embodiment of the present invention, as described above, cholesteric liquid crystals A and B having different pitches may be injected into a wedge cell. Ultraviolet (UV) rays may be radiated onto or heat may be applied to the whole part of the wedge cell at a time when a consecutive wavelength-variable resonator is formed, thereby fabricating and using a polymer cholesteric liquid crystal (PCLC). The time when the consecutive wavelength-variable resonator is formed, i.e., the UV rays or heat is applied, may be determined by a selection of a designer. Also, the designer may select different times in all desired wavelength-variable regions.

An UV curable PCLC is fabricated as follows. If a pitch gradient is formed in the wedge cell due to diffusions of the cholesteric liquid crystals A and B, UV rays are radiated onto the choelsteric liquid crystals or the wedge cell at a predetermined intensity for a predetermined time at a time when a consecutive wavelength-variable resonator is formed, thereby polymerizing, i.e., solidifying, the cholesteric liquid crystals in liquid form. Therefore, diffusion is not generated between liquid crystals in the wedge cell any more, and thus a structure of the pitch gradient (e.g., 100 nm) may be maintained although a long time elapses.

This means that although a time elapses, a wavelength-variable optical resonator structure may be continuously semi-permanently preserved. Therefore, consecutive wavelength-variable lasing may be realized in a consecutive wavelength region having a size larger or smaller than 100 nm in a formed polymerized wedge cell device.

Figure 5:
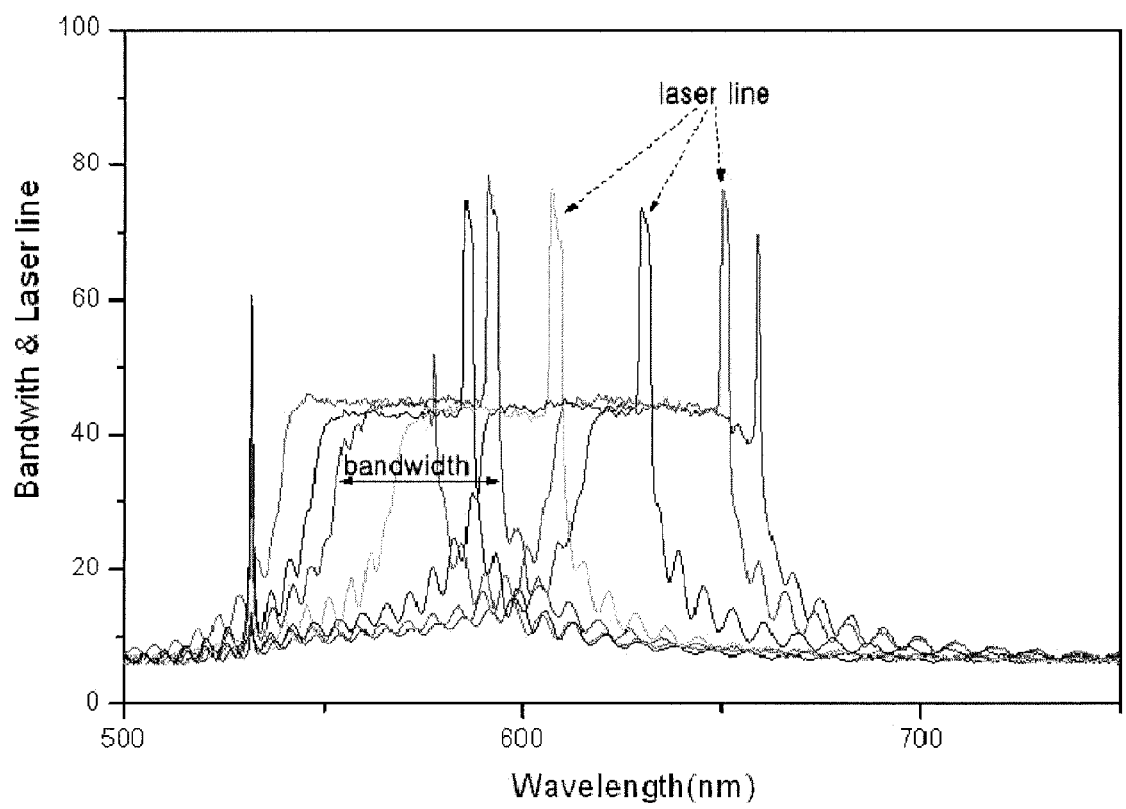
FIG. 5 is a graph illustrating bandwidth and laser lines in positions of a plurality of different bandgaps.

FIG. 5 is a graph illustrating bandwidths and a few laser lines in positions of a plurality of different bandgap according to an embodiment of the present invention. Referring to FIG. 5, as a position of a wedge liquid crystal cell is changed to radiate a pumper beam, laser mode spectrums having consecutively varying wavelengths are output. A corresponding photonic crystal bandgap, i.e., a corresponding bandwidth, is represented simultaneously with each of the laser lines.

FIGS. 6 and 7 are graphs respectively illustrating consecutive wavelength-variable lasings by using the laser oscillation devices according to the above-described embodiments of the present invention.

FIG. 6 shows the consecutive wavelength-variable lasing in the laser oscillation device which is fabricated by adding two or more laser dyes to two cholesteric liquid crystals as described in the embodiment of FIG. 1. Referring to FIG. 6, consecutive pitch gradients are formed in the liquid crystal layer 150 by using the two cholesteric liquid crystals. Also, as a position of a wedge device is changed to radiate a pumper beam, laser lines are lased with consecutively varying their wavelengths, i.e., a laser is consecutively tuned (in a range between about 577 nm and about 677 nm ($\Delta\lambda$<1 nm).

FIG. 7 shows the consecutive wavelength-variable lasing in the laser oscillation device which is fabricated by using the UV curable PCLC and two or more laser dyes as described in the embodiment of FIG. 2. Referring to FIG. 7, laser lines are lased with consecutively varying their wavelengths in consecutive wavelength regions between about 610 nm and about 640 nm.

Referring to FIGS. 6 and 7, if a resonator is formed in a wedge cell form, a length of the resonator may be consecutively varied. Also, a cholesteric liquid crystal having a pitch, which corresponds to a mode consecutively varying the length of the resonator, forms a pitch gradient in the resonator in order to consecutively oscillate a laser.

Consecutive wavelength-variable lasing sections shown in FIGS. 6 and 7 may be adjusted by adjusting a relative concentration ratio between a nematic liquid crystal and chiral dopant or radiating UV rays to change a solidifying timing. Therefore, even if the laser oscillation device is fabricated by using the UV curable PCLC, consecutive wavelength-variable lasing is possible in a section of hundreds of nm, i.e, 100 nm or more.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A laser oscillation device comprising:
    a first substrate which has a flat surface;
    a second substrate which has a flat surface and is disposed above the first substrate in such a manner that a wedge cell having a thickness-change direction is formed between the first substrate and the second substrate; and
    a liquid crystal layer which is formed by two or more liquid crystals which are doped by one or more laser dyes and injected into the wedge cell and have different pitches,
    wherein the wedge cell forms a different thickness by the flat surface of the first substrate and the flat surface of the second substrate,
    wherein the two or more liquid crystals diffuse in the wedge cell having the different thickness to form consecutive pitch gradients to form a one-dimensional laser cavity array with a continuously changing cavity length,
    wherein, in the wedge cell along the thickness-change direction of the wedge cell, a continuous linear increase in optical pitch is caused by diffusion, a pitch gradient matching with a slope of the cell thickness, and
    wherein the first substrate and the second substrate are coated with alignment layers.

2. The laser oscillation device of claim 1, wherein after the consecutive pitch gradients are formed, ultraviolet (UV) rays are radiated or heat is applied to polymerize the two or more liquid crystals.

3. The laser oscillation device of claim 1, further comprising at least two different thickness spacers which are disposed on sides of the first and second substrates to form the wedge cell.

4. The laser oscillation device of claim 3, wherein heights of the at least two different thickness spacers corresponding to a distance between the first and second substrates are different from each other, and
    wherein a distance between the two different thicknesses spacers is such that the pitch gradient is a continuous pitch gradient that matches with the slope of the cell thickness.

5. The laser oscillation device of claim 1, wherein the two or more liquid crystals are respectively injected into a side of the wedge cell having a thick thickness and another side of the wedge cell having a thin thickness in opposite directions.

6. The laser oscillation device of claim 1, wherein:
    the two or more liquid crystals are cholesteric compounds with laser dyes or cholesteric liquid crystals which are formed of a nematic liquid crystal, chiral dopant, and laser dyes; and
    the different pitches are determined by a relative concentration ratio between the nematic liquid crystal and the chiral dopant.

7. The laser oscillation device of claim 1, wherein the one-dimensional laser cavity array with the pitch gradient provides a continuous laser wavelength tuning in a broad spectral range, with a tuning resolution of $\Delta\lambda$<1 nm by a laser pumping.

8. The laser oscillation device of claim 1, wherein the substrates are planar and coated with alignment layers which are rubbed.

* * * * *